United States Patent Office 3,265,729
Patented August 9, 1966

3,265,729
PROCESS OF PURIFYING PHTHALIC ACIDS
George P. Olsen, Chicago, Ill., and Delbert H. Meyer, Highland, Ind., assignors to Standard Oil Company, Chicago, Ill., a corporation of Indiana
No Drawing. Filed Mar. 29, 1963, Ser. No. 269,182
8 Claims. (Cl. 260—525)

This invention relates to the purification of phthalic acids.

Phthalic acids are becoming of increasing commercial importance, being used in esterified form for plasticizers and raw materials for resin manufacture, and in particular being used directly or as an initial raw material in the manufacture of high molecular weight polymers from which fibers and films are made. Terephthalic acid, from which is made high molecular weight polyesters such as Dacron, Mylar, Kodel, Vycron, is particularly important. Because of the adverse affect of relatively small amounts of impurities generally found in commercially available terephthalic acid, it has not been practical to make such polyesters directly from terephthalic acid, but the terephthalic acid is instead esterified, generally with methanol, to make dimethyl terephthalate, which is then transesterified with an appropriate glycol and polycondensed to form the polyester. The conversion to dimethyl terephthalate has been used as a means of eliminating the impurities from terephthalic acid, but is an expensive process and not inherently necessary inasmuch as acceptable polyesters suitable for textile manufacture may be made directly from terephthalic acid if its purity is sufficiently high.

It has now been discovered that phthalic acids may be purified by forming an alkaline aqueous solution of the crude acid, contacting the solution in the presence of gaseous oxygen with a supported noble metal catalyst, acidifying the solution to precipitate the acid, and thereafter recovering the purified product acid.

The phthalic acid to be purified generally has less than about 5% impurities in it when made by processes now well known, such as oxidation of an appropriately substituted alkyl benzene (or a partially oxidized derivative thereof), by oxidation with nitric acid, or by oxygen using a heavy metal catalyst preferably in the conjoint presence of bromine, or by the isomerization or disproportionation of various inorganic salts of another benzene dicarboxylic acid. The purification process of this invention is particularly suitable for purifying terephthalic acid, which presents unusual problems in purification. The avoidance of small amounts of by-products or partially oxidized products is difficult when oxidizing a para-dialkyl benzene to terephthalic acid. These undesirable contaminants are difficult to remove from terephthalic acid because it cannot be distilled without subliming at temperatures below its thermal decomposition point and because it is relatively insoluble in most solvents. Also, when recrystallized from a solvent, terephthalic acid apparently has a tendency to bring down with its crystals a significant fraction of the impurities which were in the crude acid. The character of the impurities generally found in terephthalic acid has not been definitively delineated. One, however, is known to be 4-carboxybenzaldehyde. Other impurities, not identified but perhaps of a benzyl, fluoronone or extensively olefinically conjugated type, may also be present. In view of the relative ease of quantitatively determining 4-carboxybenzaldehyde, the amount of that compound in terephthalic acid has been used extensively as a criterion of effectiveness in purification procedures. For ease of discussion, the remainder of the process description relates to terephthalic acid except as otherwise noted.

In conducting the process, an aqueous alkaline solution of the acid to be purified is first prepared. This may be done by adding an alkaline reagent to a solution of the phthalic acid in water, or, more preferably, by adding the acid to water containing an alkaline reagent. The latter procedure is preferred because the amount of acid which may be dissolved in an alkaline solution is considerably greater than may be dissolved in an acidic aqueous solution. About 11 pounds of terephthalic acid may be dissolved per 100 pounds of aqueous sodium hydroxide solution at 100° C. Whenever weight percentages of a phthalic acid in an alkaline solution are referred to hereinafter it will be on the basis of the percentage of the acid based on total weight of solution, although it is recognized that in such a solution the acid will be in the form of a salt.

The solution may be made alkaline with either strong or weak bases, such as the alkali metal hydroxides or carbonates, ammonium hydroxide or primary amines. Alkali metal hydroxides are preferred relative to alkali metal carbonates or amines, because lesser amounts of them need be used to achieve a given pH level. When ammonium hydroxide is used, the process is advantageously conducted at an elevated partial pressure of ammonia in order to maintain the pH of the solution at the temperature of operation.

The pH of the solution must be alkaline, desirably in the range of 8 to 12, and advantageously between about 9 and 11. The purification reaction proceeds with increasing rapidity as the pH is increased from 7 to about 9 or 10 and then appears to level off. The reaction may be conducted at a pH above about 12, but no technological advantage is gained by so doing to offset the economic disadvantage resulting from the increased use of alkaline reagent.

The contacting of the aqueous alkaline solution with the catalyst may be done at temperatures upwards from about 25° C., up to 200–300° C. However, the purification reaction proceeds slowly at room temperature, and little advantage is gained by operating above 100° C. A preferred operating temperature is in the range of about 50° C. to about 100° C., advantageously at the atmospheric boiling point of the solution being purified.

The process may be conducted at pressures ranging from a partial vacuum to several hundred pounds per square inch, but is normally conducted at atmospheric pressure or slightly above except as referred to above when ammonium hydroxide is used as the alkaline reagent. However, it is necessary that gaseous oxygen be present in the catalyst contacting zone. The oxygen may be pure, or diluted with an inert gas such as nitrogen. Air is suitable. Although the oxygen partial pressure may range from about 0.01 atmosphere (for instance, 10–25 atmospheres) up to several atmospheres, using air in a system under atmospheric pressure, wherein the oxygen partial pressure will be less than about 3 p.s.i.a., is suitable.

The catalyst used in the purification process comprises a noble metal, in the range of about 0.01 to about 10 weight percent, disposed on a support. The term "noble metal" designates the six members of the platinum family of group VIII of the Periodic System, platinum, palladium, ruthenium, rhodium, iridium, and osmium. Two or more such metals may be used in equal or differing amounts in a catalyst. Although the fraction of the catalyst which is nobel metal may vary widely, entirely suitable catalysts may comprise only in the range of about 0.1 to about 1 weight percent noble metal.

Various supports for the noble metal may be used, such as activated charcoal, calcined alumina having a high surface area (greater than about 25 meters per square gram, as distinct from corundum, which has a lower surface area), other refractory inorganic oxides such as silica gel, titania, zirconia, thoria, magnesia, boria and mixtures of such oxides, kieselguhr, fuller's earth, etc. Disposing the nobel metal on a support having a high surface area, preferably upwards of 100 square meters per gram, is advantageous because it tends to reduce the amount of catalyst and the contacting time necessary to achieve a particular maximum level of impurity in the purified product. Activated charcoal, particularly when made from vegetable matter, and high surface area gamma- or eta-alumina are preferred supports for the noble metal. The support should be inert at the solution pH used.

Suitable catalysts, and the supports used in their preparation, for use in the purification process are available as items of commerce and their manufacture and use have previously been referred to in the literature; see, for instance, Kirk-Othmer's "Encyclopedia of Chemical Technology" under appropriate headings such as Catalysts, Platinum Metals and Activated Carbon, Berkman, et al.'s "Catalysis" (Rheinhold Publishing Corporation, 1940), with particular reference to Chapters 4, 7 and 10, The Aluminum Company of America's Technical Paper No. 10 titled "Alumina Properties" (the 1953, 1956 and 1960 editions) in respect of calcined aluminas of the gamma-type, which phrase excludes corundum, and such specific references to the use of noble metal catalysts as U.S. Patent No. 3,007,941, and Hawthorne, et al.'s note appearing in J. Organic Chemistry, 25, pages 2215–16 (December 1960).

The catalyst may be used in the form of a fine powder, granules, or in a shaped configuration, such as pellets, with the actual selection depending largely upon the ease of operation of the process equipment used rather than upon process criteria. However, the catalyst should be readily separable from the solution in order that traces of it may not appear in the purified product.

The contacting of the alkaline solution with the catalyst may be in a batch or continuous system. A catalyst may be simply slurried in contact with the solution, or the solution passed through a fixed bed of catalyst. Contacting time may be varied widely, from a few minutes up to an hour or more, with the actual time selected depending upon such variables as the extent of purification desired, the character of the particular catalyst used, the alkalinity of the solution, the temperature, and whether the solution is sufficiently agitated to minimize mass transfer and diffusion problems.

Relatively minor amounts of catalyst are sufficient to achieve a high purity of product acid. Generally, sufficient catalyst is used to provide about 25–1000 p.p.m. of noble metal, based on the amount of acid being purified, preferably 100–500 p.p.m. Because of the wide range of the fraction of the catalyst which is noble metal, the total amount of catalyst relative to the amount of acid being purified varies in a batch system from less than 1% to more than 20%. In continuous systems using a fixed bed of catalyst, catalyst life, expressed as pounds of acid treated per pound of catalyst, may be 50–100 or more.

After contacting the alkaline solution with the catalyst and thereafter separating the catalyst from the solution, the solution is acidified to precipitate the phthalic acid. The pH of the solution must be lowered below 7, preferably below 5 and advantageously to a pH in the range of about 1 to 4. Sufficient acid may be used to obtain an even lower pH, but there is no technological advantage to offset the increased use of acidifying acid. In addition to the mineral acids (sulfuric, hydrochloric, phosphoric and nitric), weak acids such as acetic acid may be used, and this is true even though the ionization constant of acetic acid is less than that of the phthalic acid being purified. However, the mineral acids are preferred because less acid is required to achieve a particular pH.

The precipitated phthalic acid is then separated from the solution by conventional liquid-solids separation means such as filtering, centrifuging or decanting. The separation may be done at substantially the same temperature as was used in the contacting step, or after cooling the solution. The separated purified phthalic acid may optionally be washed with a suitable solvent to remove surface-adhering mother liquor from the precipitate.

Having thus described the invention the following data are presented to illustrate various embodiments of it.

An alkaline solution consisting of 20 grams of crude terephthalic acid, 10 grams of sodium hydroxide and 250 milliliters of water was refluxed at atmospheric pressure for 2 hours. The catalyst disposed in the still pot was 0.4 gram of 5% palladium supported on powdered activated charcoal. Thereafter, the solution was filtered to separate the catalyst, the filtrate acidified with sulfuric acid to a pH of 2, whereupon the terephthalic acid precipitated, and the acid separated by filtering. The 4-carboxybenzaldehyde content was reduced from 1.41 weight percent of the crude terephthalic acid to 0.03 percent in the purified product.

Three batch runs were conducted using catalysts having varying noble metal contents. In each instance, the solution comprised 8 weight percent crude terephthalic acid, containing 1.35% of 4-carboxybenzaldehyde, dissolved in an aqueous sodium hydroxide solution having, after addition of the terephthalic acid, a pH of 10. The solution was then stirred for one hour at a temperature of 90–95° C. with catalyst comprising 10 weight percent palladium supported on powdered activated charcoal. Thereafter the catalyst was filtered from the solution, the filtrate acidified with sulfuric acid to precipitate terephthalic acid, and the latter separated by filtration. In a run using 0.0005 gram of catalyst per gram of crude terephthalic acid (sufficient to provide 500 p.p.m. of palladium based on crude acid), the 4-carboxybenzaldehyde content of the product terephthalic acid was 0.536 weight percent. When the amount of catalyst was doubled, to 0.1% based on crude terephthalic acid, the 4-carboxybenzaldehyde content of the purified terephthalic acid was reduced to 0.183 weight percent. When the amount of catalyst was again doubled, the 4-carboxybenzaldehyde content was further reduced to 0.020 weight percent (200 p.p.m.).

In runs made in the same fashion as the three runs described in the preceding paragraph, but using a pH of 5.5, the 4-carboxybenzaldehyde content of the terephthalic acid recovered from the runs was 1.31% and 1.22% when the amount of the same catalyst used was 0.0005 and 0.0020 gram per gram of crude terephthalic acid, respectively.

A continuous flow run was conducted using a 1 inch diameter jacketed glass reactor in which was disposed an 18 inch deep catalyst bed containing 107 grams of 0.5% palladium on 4–8 mesh activated charcoal. The alkaline solution contained 8% crude terephthalic acid, containing 2.58% 4-carboxybenzaldehyde, and sufficient sodium hydroxide to yield a pH of 11. The operation was conducted at 195° F. at atmospheric pressure. The solution flow rate was 5 milliliters per minute, which provided a calculated residence time of about 30 minutes. The initial effluent from the reactor had a 4-carboxybenzaldehyde content of about 200 p.p.m. or less. Thereafter, the 4-carboxybenzaldehyde content rose rapidly. At this point, 0.15 standard cubic feet per hour of air was injected into the bottom of the reactor and allowed to bubble upward through the catalyst bed. This quickly reduced the 4-carboxybenzaldehyde content in the effluent to less than 200 p.p.m. The catalyst was still effective after treating 30 grams of terephthalic acid per gram of catalyst.

In a similar type of continuous run, the residence time was reduced to about 90 seconds, and the 4-carboxybenzaldehyde content in the purified terephthalic acid was found to be less than 1000 p.p.m.

Three continuous runs were made varying the temperature at which the runs were made. Each run was made in a 1½ inch diameter jacketed glass reactor in which was disposed 60 grams of a catalyst of 0.5% palladium supported on 4–12 mesh activated carbon. The alkaline solutions contained 8.0 weight percent of crude terephthalic acid of varying impurity content and sufficient sodium hydroxide to provide a pH of 11. The flow rates were 6 milliters per minute. Air was bubbled through the reactor at the rate of 0.4 standard cubic feet per hour. When the temperature was 85° F., the 4-carboxybenzaldehyde content was reduced from 2.4% in the crude terephthalic acid to 1.2%. When the temperature was raised to 140° F., the 4-carboxybenzaldehyde content was reduced from 2.01% to 0.7% in the purified product. Finally, raising the temperature to 190° F., reduced the 4-carboxybenzaldehyde content from 2.58% to the range of 0.01–0.04%.

Having thus described the invention, what is claimed is:

1. A process for purifying phthalic acids which comprises forming an alkaline aqueous solution of a crude phthalic acid derived from one of the following: (1) the nitric acid oxidation of alkyl benzene, (2) the oxygen oxidation of alkyl benzenes and (3) the disproportionation of various inorganic salts of benzene di-, tri-, and tetra-carboxy acids, contacting said solution in the presence of gaseous oxygen with a supported noble metal catalyst, acidifying said solution to a pH below 7, whereby said acid precipitates, and thereafter recovering said acid having a reduced content of impurties relative to said crude acid.

2. The process of claim 1 wherein said solution has a pH of above 9.

3. A process of claim 1 wherein said supported noble metal is palladium on a support selected from the class consisting essentially of activated carbon and alumina having a high surface area.

4. The process of claim 1 wherein said noble metal is palladium.

5. The process of claim 1 wherein said catalyst comprises in the range of about 0.01 to 10 weight percent of a noble metal.

6. The process of claim 1 wherein said solution is made alkaline with sodium hydroxide.

7. The process of claim 1 wherein said solution is made alkaline with ammonium hydroxide.

8. A process for purifying crude terephthalic acid which process comprises forming an alkaline aqueous solution of terephthalic acid derived from the following: (1) the nitric acid oxidation of alkyl benzene, (2) the oxygen oxidation of alkyl benzenes and (3) the disproportionation of various inorganic salts of benzene di-, tri-, and tetra-carboxy acids, contacting said solution in the presence of gaseous oxygen with a catalyst comprising from about 0.1 to 10 weight percent palladium supported on activated charcoal, thereafter acidifying said solution with sulfuric acid whereupon the terephthalic acid precipitates, and recovering from said solution terephthalic acid having a substantially reduce impurity content relative to said crude acid.

References Cited by the Examiner

UNITED STATES PATENTS

| 2,939,847 | 6/1960 | Smith et al. | 252—466 |
| 3,007,941 | 11/1961 | Copelin et al. | 252—466 |
| 3,047,621 | 7/1962 | Tate | 260—525 |

FOREIGN PATENTS

| 786,897 | 11/1957 | Great Britain. |
| 788,276 | 12/1957 | Great Britain. |

OTHER REFERENCES

Geissman: Organic Reactions, vol. II, pp. 94, 95, 103–8 (1962).

LORRAINE A. WEINBERGER, *Primary Examiner.*

LEON ZITVER, *Examiner.*

M. S. JAROSZ, S. B. WILLIAMS,
*Assistant Examiners.*